United States Patent [19]

Chan et al.

[11] Patent Number: 5,764,745
[45] Date of Patent: Jun. 9, 1998

[54] APPARATUS AND METHOD FOR LOCAL NUMBER PORTABILITY USING NONGEOGRAPHIC SUBSCRIBER NUMBERS

[75] Inventors: May Y. Chan, Waltham; Arthur A. Giordano, Burlington; I-Hsiang Yu, Lexington, all of Mass.

[73] Assignee: GTE Laboratories Incorporated, Waltham, Mass.

[21] Appl. No.: 573,271

[22] Filed: Dec. 15, 1995

[51] Int. Cl.$^6$ ............................................. H04M 3/42
[52] U.S. Cl. .......................... 379/207; 379/220; 379/229
[58] Field of Search .................................. 379/201, 207, 379/210, 213, 216, 219, 220, 221, 229, 230

[56] References Cited

U.S. PATENT DOCUMENTS

| | | | |
|---|---|---|---|
| 5,259,026 | 11/1993 | Johnson | 379/207 |
| 5,553,130 | 9/1996 | Turner | 379/220 |
| 5,583,926 | 12/1996 | Venier et al. | 379/207 |
| 5,598,464 | 1/1997 | Hess et al. | 379/213 |

OTHER PUBLICATIONS

Heller et al., "Phone Numbers on the Move," Telephony, pp. 46–50, Nov. 13, 1995.

Giordano, A., Chan, M. *PCS Number Portability* Personal, Indoor and Mobile Radio Communications, Sep. 18–22, 1994) The Hague, Netherlands.

*Primary Examiner*—Daniel S. Hunter
*Attorney, Agent, or Firm*—Leonard C. Suchyta

[57] ABSTRACT

An apparatus and method for telecommunications network local number portability supports service provider portability, location portability, and service portability. A subscriber is assigned a nongeographic subscriber number that is uniquely mapped to a location-based geographic terminal location number. Different embodiments of the apparatus query different combinations of databases to obtain the nongeographic subscriber number to geographic terminal location number mapping that allows a call to a nongeographic subscriber number to be routed and delivered using existing network routing mechanisms. The originating switch determines whether a received called number is a geographic terminal location number or a nongeographic subscriber number that will require the originating switch to query a database to request that the number be mapped to a geographic terminal location number. The queried database can contain the information for mapping a nongeographic subscriber number to a geographic terminal location number, either for all valid nongeographic subscriber numbers or for only the nongeographic subscriber numbers of a specific service provider, can contain information for mapping all valid nongeographic subscriber numbers to service provider identification codes containing either network routing information or the address of another database, or a combination of both. If the queried database is able to map the called number to a geographic terminal location number, it returns that number to the originating switch for call routing. If the database is unable to map the nongeographic subscriber number to a geographic terminal location number, it can either query a second database for a service provider identification code or itself return a service provider identification code to the originating switch. The first database then uses the received service provider identification code to identify another database to query for the geographic terminal location number, forwards the code to the originating switch which then makes the query, or uses the network routing information to route the call for further handling using existing network routing mechanisms.

28 Claims, 7 Drawing Sheets

Fig. 7

APPARATUS AND METHOD FOR LOCAL NUMBER PORTABILITY USING NONGEOGRAPHIC SUBSCRIBER NUMBERS

FIELD OF THE INVENTION

The present invention relates to electronic communications systems and, in particular, to telecommunications network service provision and routing mechanisms.

BACKGROUND OF THE INVENTION

Local number portability (LNP) is a telecommunication service that offers to subscribers the benefits of service provider portability, location portability, and service portability. Service provider portability is intended to give subscribers the ability to choose to obtain local telephone services from any service provider while retaining the same telephone number. This capability is not available to end users today and, in particular, would allow competition for local telephone service. Location portability permits subscribers to retain the same telephone number after moving to a new location, even if the new location is outside the serving area of the current serving end office. End users today can usually retain the same telephone number only when relocating within the serving area of the current serving end office. Service portability allows subscribers to obtain any type of telecommunications services while retaining the same telephone number, regardless of the capabilities of the current serving end office. Currently, end users can elect to receive only those services that are supported by the capabilities of the current serving end office.

Today, a telephone subscriber's directory number is usually a geographic number under the North American Numbering Plan (NANP), in the NPA-NXX-XXXX format, where NPA is the Numbering Plan Area code (also called the "area code"), NXX is the central office code, and XXXX identifies the station number. This geographic number uniquely identifies both the subscriber and the physical location of the subscriber's terminal. Because the NPA-NXX code uniquely identifies to the network the subscriber's serving end office, it is not possible for a subscriber to retain an existing telephone number when relocating to the service area of a different end office or when changing service providers.

Geographic numbers currently play an important role in the billing of telephone calls. Because each number identifies both the subscriber and the physical location of the subscriber's terminal, the system is able to correctly assign and bill calls made by a particular subscriber, as well as to bill for those calls based on the distance between terminals. The geographical information provided by the geographic number is used by the current network billing system for distance rating and for levying variable access charges for calls both within and beyond the Local Access and Transport Area (LATA). As a result, any move away from a geographic number based scheme needs to take the needs of the billing system into account.

Location portability beyond the coverage area of the serving end office is currently available only through a very limited, and very expensive, method known as "Foreign Exchange" service. This service allows a subscriber to keep an existing telephone number when the subscriber relocates within a limited distance outside the service area of the original end office. Foreign Exchange service physically connects the subscriber's telephone at the new location to the original serving end office, typically via a trunk circuit that runs between the original serving end office and the new local end office. The Foreign Exchange subscriber therefore continues to actually be served by the original serving end office.

Foreign Exchange service is limited in distance; it cannot be offered if the original serving end office and the subscriber are located in different LATAs. Foreign Exchange service is therefore not a robust location portability service. It also cannot be instituted in anticipation of a relocation, but only after the fact, potentially resulting in a period of time without service. Foreign Exchange service requires an inefficient use of significant network resources in order to serve a single subscriber. Further, service provider portability is not supported by this method because subscribers must still be physically served by the original end office.

Foreign Exchange service is also very costly to the subscriber. The subscriber is charged a monthly fee for the service that is based on the sum of the monthly charge at the original serving end office plus a fee tariffed on the physical distance between the original serving end office and the new local end office. In addition, the subscriber must pay a one-time installation charge. People living in the same physical area as the Foreign Exchange subscriber will also generally end up paying toll charges when calling the subscriber, unless the subscriber also pays for an additional number with the local end office.

OBJECTS OF THE INVENTION

Accordingly, a primary object of the present invention is to provide complete service provider portability, location portability, and service portability to subscribers, and to meet this object through an architecture that minimizes the impact on both the existing network infrastructure and other end users of the telephone network and that solves any problems of call routing and billing which arise.

In particular, an object of the present invention is to give subscribers the ability to obtain local telephone services from any service provider while retaining the same nongeographic subscriber number.

A further particular object of this invention is to permit subscribers to retain the same nongeographic subscriber number after relocation to a new location outside the serving area of a current serving end office.

An additional particular object of this invention is to allow subscribers to obtain any telecommunications services desired while retaining the same nongeographic subscriber number, regardless of the capabilities of the current serving end office.

SUMMARY

The apparatus and method of the present invention utilize nongeographic subscriber numbers, which are numbers that are not tied to a particular physical location and which are specifically allocated for local number portability purposes. Each valid nongeographic subscriber number will uniquely identify a particular local number portability subscriber.

In one embodiment of the present invention, when an originating switch receives a called number from a telecommunications terminal, it determines whether the called number is a geographic terminal location number, which uniquely identifies the physical location of a telecommunications terminal, or a nongeographic subscriber number. If the called number is a geographic terminal location number, the switch routes the associated call utilizing existing network call routing mechanisms to a destination switch that delivers the call to the terminal having that geographic terminal location number. If the called number is a nongeographic subscriber number, the originating switch instead sends a query to an associated service provider database, requesting that the nongeographic subscriber number be mapped to a geographic terminal location number.

The service provider database contains the information for mapping the nongeographic subscriber numbers belonging to the service provider's own subscribers to geographic terminal location numbers. If the service provider database is able to map the nongeographic subscriber number to a geographic terminal location number, it returns the geographic terminal location number to the originating switch. In this embodiment, if the service provider database is unable to map the nongeographic subscriber number to a geographic terminal location number, it sends a query to a global local number portability database in order to identify the service provider for that particular nongeographic subscriber number.

The global local number portability database contains information for mapping all valid nongeographic subscriber numbers to service provider identification codes. A service provider identification code can contain network routing information or the address of a particular service provider's database. If the service provider identification code received from the global local number portability database contains network routing information, the service provider database forwards the network routing information to the originating switch, which then routes the call with the nongeographic subscriber number for further handling utilizing existing network call routing mechanisms. In this embodiment, if the service provider identification code contains the address of another service provider's database, the first service provider database sends the second a request that the received nongeographic subscriber number be mapped to a geographic terminal location number. The second service provider's database returns the geographic terminal location number, which the first service provider database then forwards to the originating switch for call routing.

In another embodiment, the service provider database returns whatever response is received from the global local number portability database directly to the originating switch. The originating switch has the capability to analyze a received service provider identification code and determine whether it contains network routing information or the address of another service provider's database. If the response contains network routing information, the originating switch routes the call with the nongeographic subscriber number for further handling, using existing network call routing mechanisms. If the response contains the address of another service provider's database, the originating switch sends a query directly to that database requesting that the received nongeographic subscriber number be mapped to a geographic terminal location number. The other service provider's database responds with the geographic terminal location number, and the originating switch routes the call accordingly.

In an alternate embodiment, the originating switch directly asks the global local number portability database to translate the received nongeographic subscriber number. The global local number portability database then maps the received nongeographic subscriber number to a service provider identification code. If the service provider identification code thus obtained contains the address for a service provider database, the global local number portability database queries that service provider database for the geographic terminal location number. The geographic terminal location number received from the service provider database is then forwarded by the global local number portability database to the originating switch for call routing. Alternatively, the global local number portability database can return the service provider identification code to the originating switch and the originating switch can then directly query the service provider database for the geographic terminal location number.

In another embodiment, when the originating switch receives, from either a global local number portability database or an associated service provider database, a service provider identification code that contains network routing information to reach an intermediate switch, the originating switch sends the nongeographic subscriber number to the intermediate switch using the received network routing information. The intermediate switch then queries an associated service provider database for the geographic terminal location number necessary to route the call.

In a different embodiment of the invention, there is a single global database containing information for mapping all valid nongeographic subscriber numbers to geographic terminal location numbers. In this embodiment, the originating switch sends a query directly to the single global database, which maps the nongeographic subscriber number to a geographic terminal location number. The global database then returns the geographic terminal location number directly to the originating switch, which routes the call to the destination switch.

Another embodiment of the apparatus has a combined service provider/global database, containing information for mapping the nongeographic subscriber numbers of the service provider's own subscribers to geographic terminal location numbers and information for mapping the remaining valid nongeographic subscriber numbers to service provider identification codes. In this embodiment, when a call is made utilizing a nongeographic subscriber number, the originating switch sends a query to the combined service provider/global database. If the combined service provider/global database has the information to map the nongeographic subscriber number to a geographic terminal location number, it returns the geographic terminal location number to the originating switch. Otherwise, it maps the nongeographic subscriber number to a service provider identification code. In this embodiment, if the service provider identification code contains network routing information, the combined service provider/global database returns it as a response to the originating switch, but if the service provider identification code contains the address of another service provider's database, the combined service provider/global database sends it a query. The other service provider's database returns the geographic terminal location number to the combined service provider/global database for forwarding to the originating switch. The second service provider's database may also itself be a combined service provider/global database.

In an additional embodiment of the invention, the apparatus again has a combined service provider/global database. If the combined service provider/global database has the information to map the nongeographic subscriber number to a geographic terminal location number, it does so and returns the geographic terminal location number to the originating switch. Otherwise, the combined service provider/global database maps the nongeographic subscriber to a service provider identification code which it then returns directly to the originating switch. In this embodiment, the originating switch then analyzes the service provider identification code to determine whether it contains network routing information or the address of a second service provider's database.

If the service provider identification code contains network routing information, the originating switch routes the call based on the received network routing information for further handling. If the service provider identification code contains the address of another service provider's database, the originating switch queries the second database, which returns the geographic terminal location number to the originating switch. The second service provider's database may also be a combined service provider/global database.

DETAILED DESCRIPTION OF THE PREFERRED EMBODIMENT

The apparatus for telecommunications network local number portability of the present invention provides an overlay network on the existing telecommunications network infrastructure that is capable of supporting service provider portability, location portability, and service portability. Once assigned a nongeographic subscriber number, subscribers will be able to keep that number when relocating, without any requirement for a physical connection to the previous serving end office. Subscribers will also be able to keep the same nongeographic subscriber number when changing service providers, and will be able to subscribe to services not supported by their current serving end office. By using nongeographic numbers, the apparatus minimizes the impact of providing such services on both the existing infrastructure and on non-subscribers, and permits that all calls other than those to nongeographic subscriber numbers be processed in the existing manner.

A geographic terminal location number is usually a 10-digit North American Numbering Plan (NANP) number, in the NPA-NXX-XXXX format, where NPA is the Numbering Plan Area code (also called the "area code"), NXX is the central office code, and XXXX identifies the station number. This geographic terminal location number (GN) uniquely identifies both a subscriber and the physical location of the subscriber's terminal. The NPA-NXX code uniquely identifies the subscriber's serving end office to the network, while the XXXX code identifies the subscriber's specific location within the serving area of that end office.

Use of a geographic terminal location number to identify a subscriber has a number of limitations. Because the geographic terminal location number is tied to a specific physical location, a subscriber who relocates geographically outside the serving area of the current serving end office cannot generally keep the same phone number. The subscriber also cannot currently retain an existing phone number when changing service providers, and cannot subscribe to any special telecommunications services that are not supported by the current end office.

A nongeographic subscriber number (NGN) will, in a preferred embodiment, be a unique 10-digit number in the same format as the NANP geographic terminal location numbers and will be allocated specifically for local number portability purposes. Subscribers will be assigned a nongeographic subscriber number upon signing up for local number portability service or upon contacting a service provider and requesting one. Administration of nongeographic subscriber numbers will be on a centralized basis, as is currently done for "800" numbers. A nongeographic subscriber number will contain no information about the subscriber except for the subscriber's identity and will serve as a logical address which must be mapped to a physical address for call routing and billing. Specific NPAs, which may be allocated from the nongeographic Interchangeable Numbering Plan Area (INPA) numbers, will be designated as local number portability nongeographic subscriber numbers, in order to enable the originating switch to distinguish a nongeographic subscriber number from a geographic terminal location number solely by examining the number itself. A major advantage of this strategy is that a database query need not be launched for every call, but rather only for those calls made to a nongeographic subscriber number. If only geographic terminal location numbers are used, a database query to determine if the number has been ported must be done for every call, with increased delays in connect time and increased demands on the database.

Use of a nongeographic subscriber number has several other advantages over using only traditional geographic terminal location numbers. Utilizing the apparatus of this invention, service provider portability, location portability, and service portability are all possible. Because a nongeographic subscriber number is not tied to a particular geographic location, a subscriber can also obtain and publicize a nongeographic subscriber number in advance of a move. This might be particularly useful, for example, for a business which is relocating its offices. In addition, a service provider can allow a local number portability subscriber to specifically pick the NXX-XXXX portion of the nongeographic subscriber number (analogous to a vanity license plate).

Figure 1:
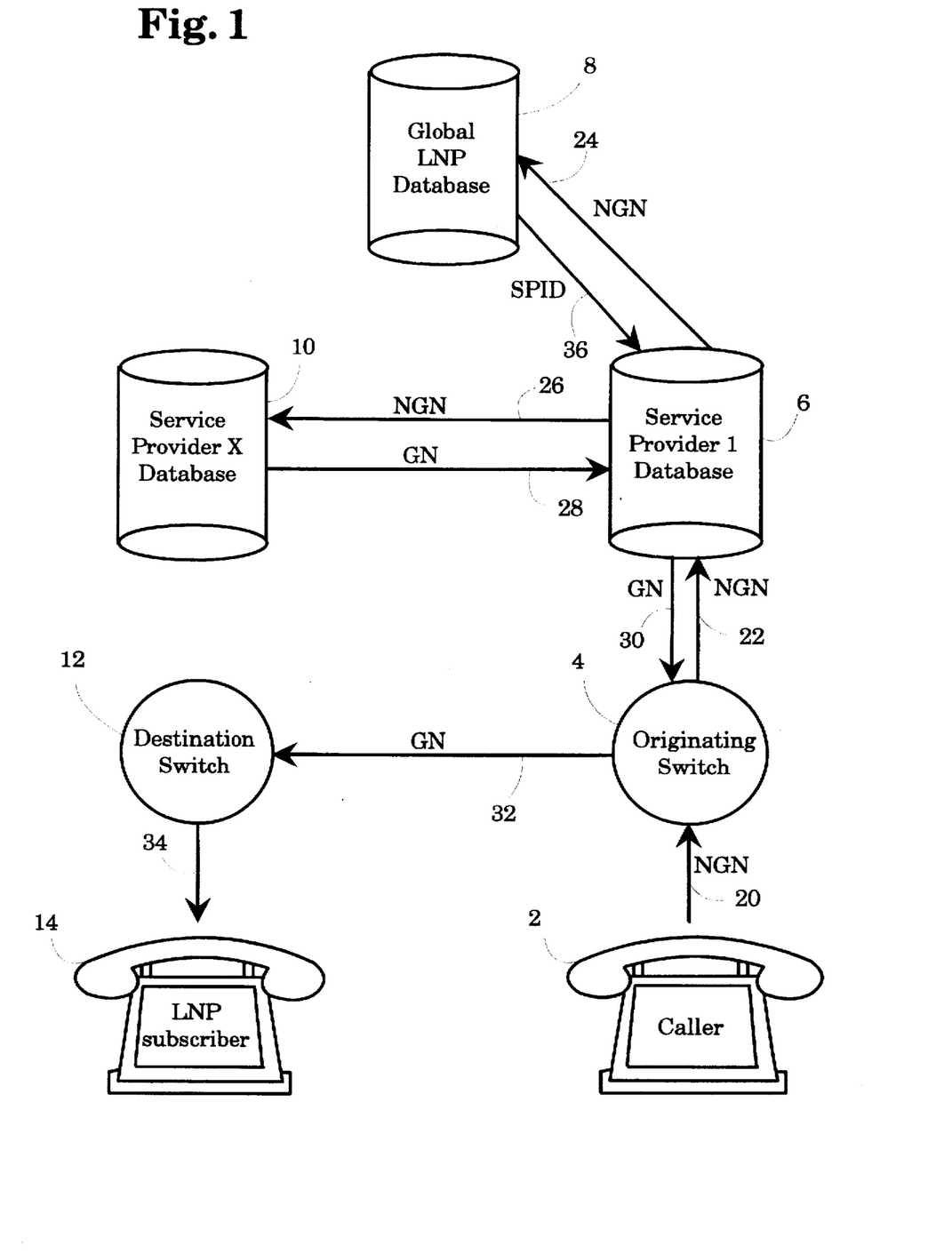
FIG. 1 is a logical block diagram of an apparatus for local number portability using nongeographic subscriber numbers that utilizes a global database and multiple service provider databases with inter-service provider database query according to one embodiment of the present invention.

In one embodiment, the apparatus for telecommunications network local number portability using nongeographic subscriber numbers of FIG. 1 initially routes a called number to an originating switch 4 from a calling telecommunications terminal 2 through an existing network connection 20. The originating switch 4 determines whether the called number is a geographic terminal location number or a nongeographic subscriber number. If the originating switch 4 is not a query-capable switch, the nongeographic subscriber number will then be routed, possibly through a series of intervening switches which are not query-capable, to a switch that has query capability, allowing it to substitute for the originating switch in the performance of the necessary query functions.

If the originating switch 4 determines that the called number is a geographic terminal location number, the originating switch 4 routes the associated call using existing network call routing mechanisms 32 to a destination switch 12, which then delivers the call through an existing network connection 34 to the destination terminal 14 associated with that geographic terminal location number. If the destination terminal is connected through an existing connection directly to the originating switch 4, the originating switch 4 will route the call with the called number directly to the destination terminal. When the called number is a geographic terminal location number, existing routing and billing mechanisms remain unaffected by the local number portability apparatus and both calling and receiving parties experience no change in call setup time.

If the originating switch 4 determines that the called number is a nongeographic subscriber number, the originating switch 4 formulates and sends a request for translation query 22 to an associated service provider database 6, requesting that the nongeographic subscriber number be mapped to a geographic terminal location number. The service provider database 6 contains the information for mapping the nongeographic subscriber numbers of the service provider's own subscribers to geographic terminal location numbers. If the service provider database 6 is able to map the nongeographic subscriber number to a geographic terminal location number, it returns the geographic terminal location number in a response 30 to the originating switch 4. The originating switch 4 then routes the associated call to the destination switch 12 using existing network call routing mechanisms 32.

In this embodiment, if the service provider database 6 is unable to map the nongeographic subscriber number which was received in the query 22 from the originating switch 4 to a geographic terminal location number, it formulates and sends a query 24 to the global local number portability database 8. The global local number portability database 8 is used to identify the service provider for a particular nongeographic subscriber number and contains information for mapping all valid nongeographic subscriber numbers to service provider identification codes. A service provider identification code (SPID) can contain a form of network routing information, such as a Carrier Identification Code (CIC), a trunk group identification, or a switch address, or, alternatively, may contain the address of another service provider database 10. If Signaling System 7 (SS7) signaling is used, this latter address might be an SS7 point code and a subsystem number. The local number portability architecture will work for any number of service provider databases.

The global local number portability database 8 returns the service provider identification code in a response 36 to the service provider database 6. If the service provider identification code contains network routing information, the service provider database 6 forwards the network routing information in a response 30 to the originating switch 4, which then routes the call with the nongeographic subscriber number, according to the received network routing information, for further handling utilizing existing network call routing mechanisms. In this embodiment, if the service provider identification code contains the address of a second service provider database 10, the first service provider database 6 formulates and sends a request for translation query 26 to the second service provider database 10, requesting that the received nongeographic subscriber number be mapped to a geographic terminal location number. The second service provider database 10 returns the geographic terminal location number in a response message 28 to the first service provider database 6.

Figure 2:
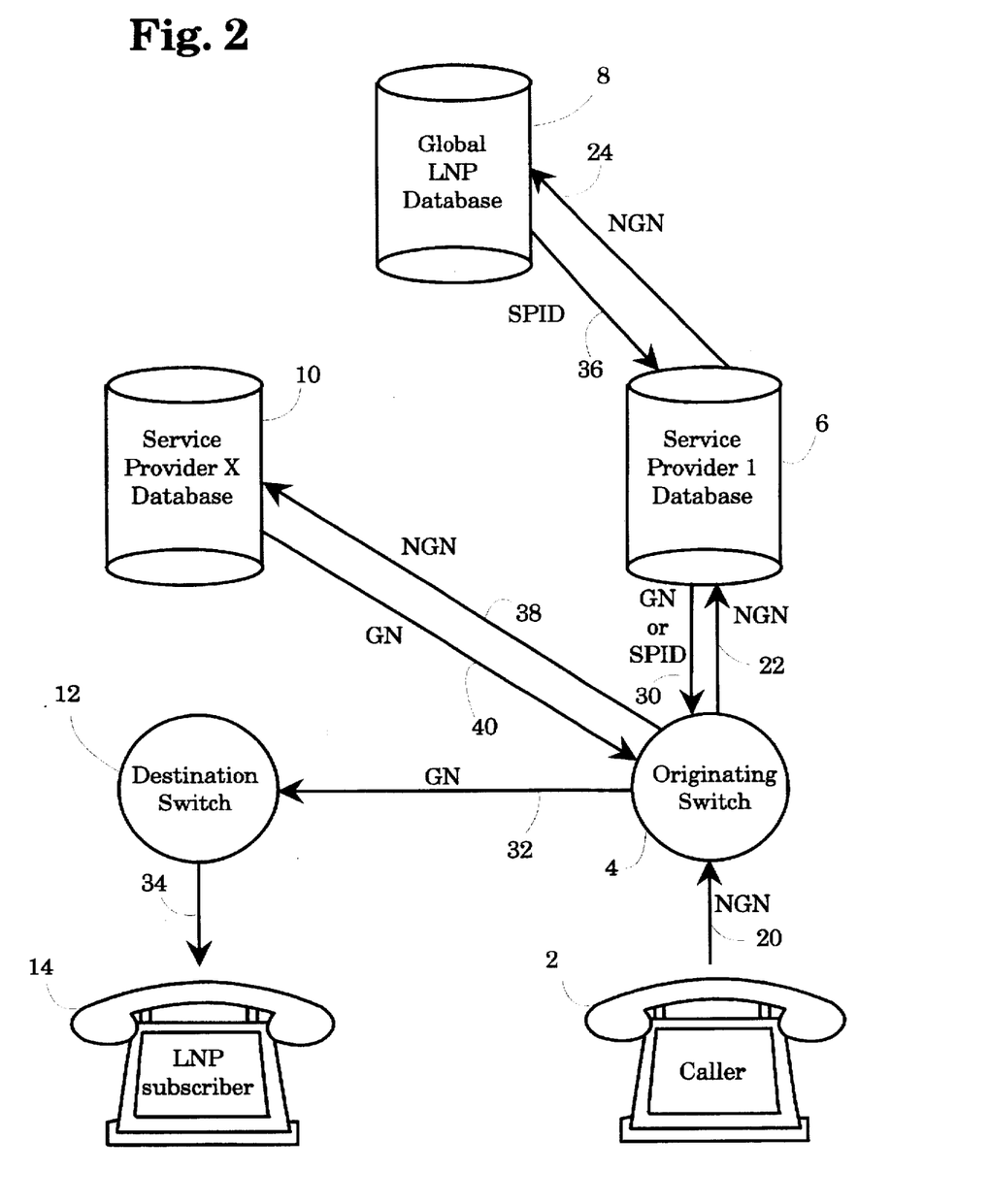
FIG. 2 is a similar view of an apparatus for local number portability using nongeographic subscriber numbers that utilizes a global database and multiple service provider databases with direct originating switch query according to another embodiment of the present invention.

In another embodiment, shown in FIG. 2, the first service provider database 6 forwards the response 36 received from the global local number portability database 8 directly to the originating switch 4 in a response 30. The originating switch 4 has the capability to analyze a received service provider identification code to determine whether it contains network routing information or the address of a second service provider database 10. If the received response 30 is a geographic terminal location number or a service provider identification code containing network routing information, the originating switch 4 will route the call accordingly, using existing network routing mechanisms 32.

If the first service provider database 6 returns a service provider identification code containing the address of another service provider database 10, the originating switch 4 formulates and sends a request for translation query 38 to the second service provider database 10, requesting that the received nongeographic subscriber number be mapped to a geographic terminal location number. The second service provider database 10 returns the geographic terminal location number in a response 40 to the originating switch 4, which then routes the call in the normal manner.

Figure 3:
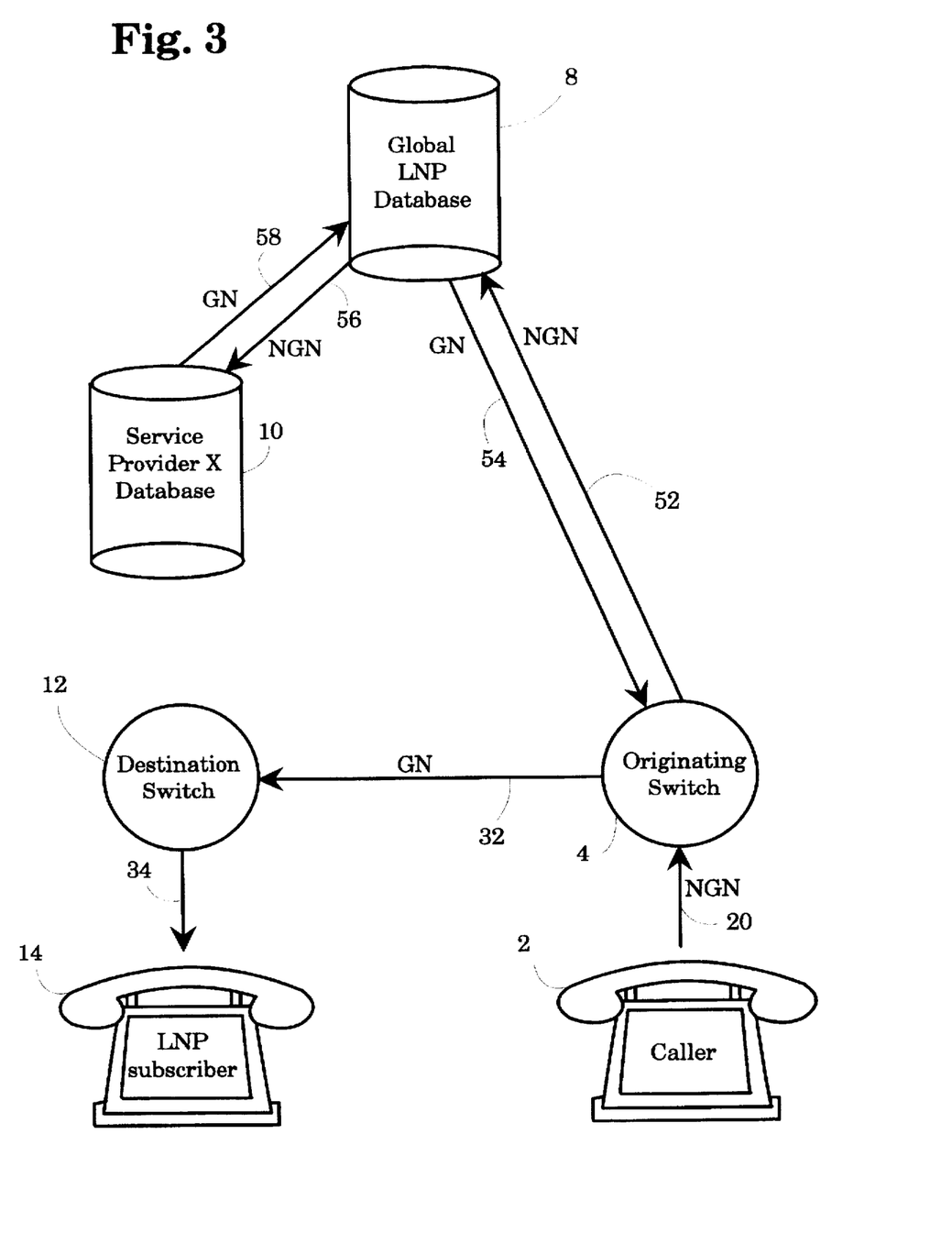
FIG. 3 is a logical block diagram of an apparatus for local number portability using nongeographic subscriber numbers that utilizes a service provider database with a single global database that is directly queried by the originating switch according to a further embodiment of the present invention.

In an alternate embodiment, illustrated in FIG. 3, the originating switch 4 sends a query 52 directly to the global local number portability database 8, asking it to translate the received nongeographic subscriber number. The global local number portability database 8 then maps the received nongeographic subscriber number to a service provider identification code. If the service provider identification code contains network routing information, the global local number portability database 8 returns it to the originating switch 4 in a response 54 and the originating switch 4 routes the call for further handling accordingly. If the service provider identification code contains the address for a service provider database 10, the global local number portability database 8 sends a request for translation query 58 to the service provider database 10, requesting that the nongeographic subscriber number be mapped to a geographic terminal location number. The geographic terminal location number received by the global local number portability database 8 from the service provider database 10 is then forwarded to the originating switch 4 for call routing.

Figure 4:
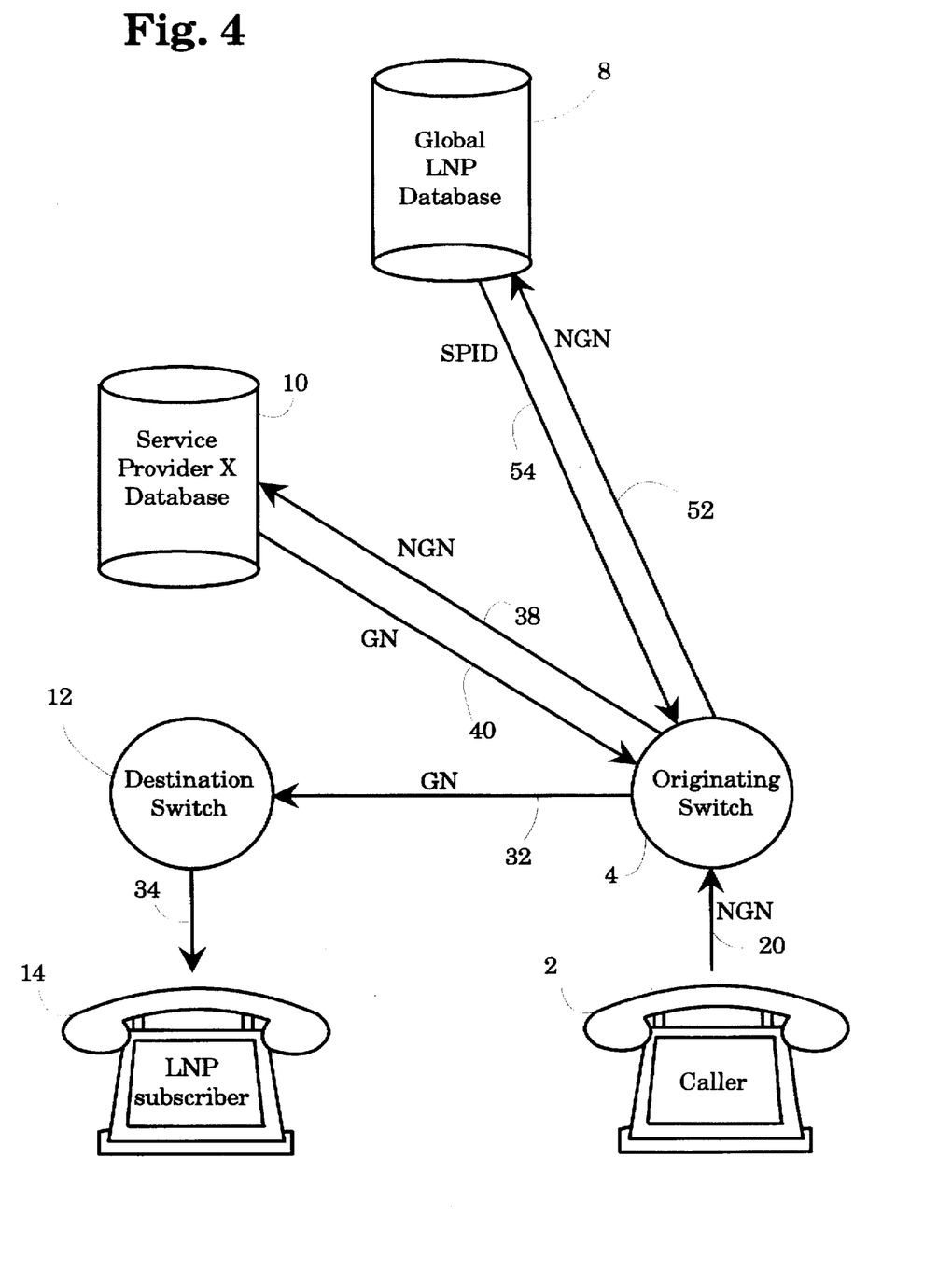
FIG. 4 is a similar view of an apparatus for local number portability using nongeographic subscriber numbers that utilizes a single global database and a service provider database that are directly queried by the originating switch according to an additional embodiment of the present invention.

Alternatively, as is shown in FIG. 4, the global local number portability database 8 returns the service provider identification code directly to the originating switch 4. The originating switch 4 then directly queries the service provider database 10 in a request for translation query 38 for the geographic terminal location number. The service provider database 10 returns the geographic terminal location number in a response 40 to the originating switch for call routing.

In an alternate embodiment of the invention, the global local number portability database 8 of FIG. 4 is replaced by a single global database containing information for mapping all valid nongeographic subscriber numbers to geographic terminal location numbers. In this embodiment, the originating switch 4 formulates and sends a request for translation query 52 directly to the global database, which receives the nongeographic subscriber number, maps it to a geographic terminal location number, and returns the geographic terminal location number directly to the originating switch 4 in a response 54. The originating switch 4 then routes the call utilizing existing network call routing mechanisms 32.

Figure 5:
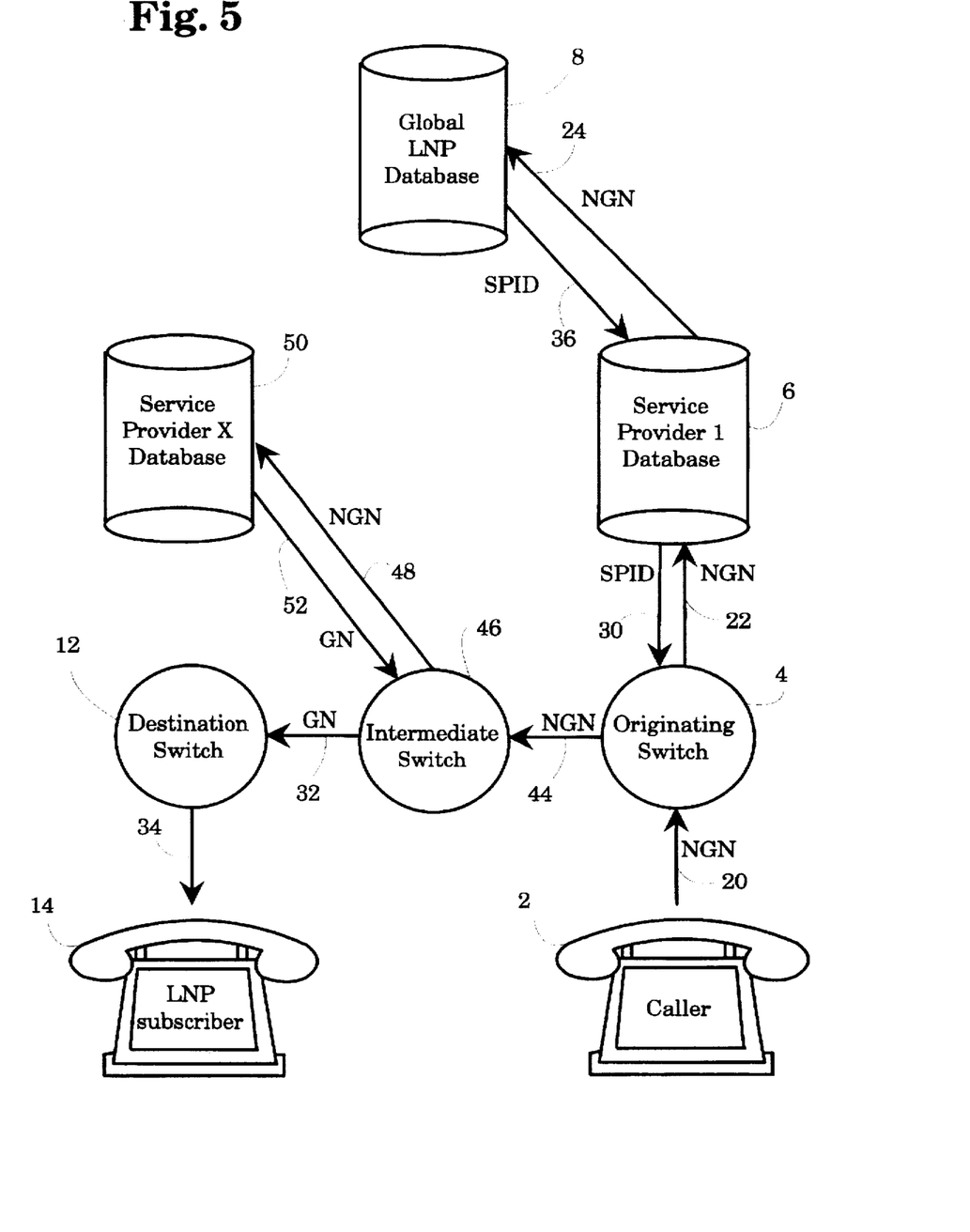
FIG. 5 is a logical block diagram of an apparatus for local number portability using nongeographic subscriber numbers that utilizes an intermediate switch with query capability according to another embodiment of the present invention.

In a different embodiment, shown in FIG. 5, when the originating switch 4 receives, either directly from a global local number portability database 8 or an associated service provider database 6, a service provider identification code that contains network routing information to reach an intermediate switch 46, the originating switch 4 forwards the nongeographic subscriber number along an existing network connection 44 to the intermediate switch 46 using the received network routing information. The intermediate switch 46 then formulates and sends a request for translation query 48 to an associated service provider database 50. The service provider database 50 returns the geographic terminal location number in a response 52 to the intermediate switch 46, which then routes the call utilizing existing routing mechanisms 32.

Figure 6:
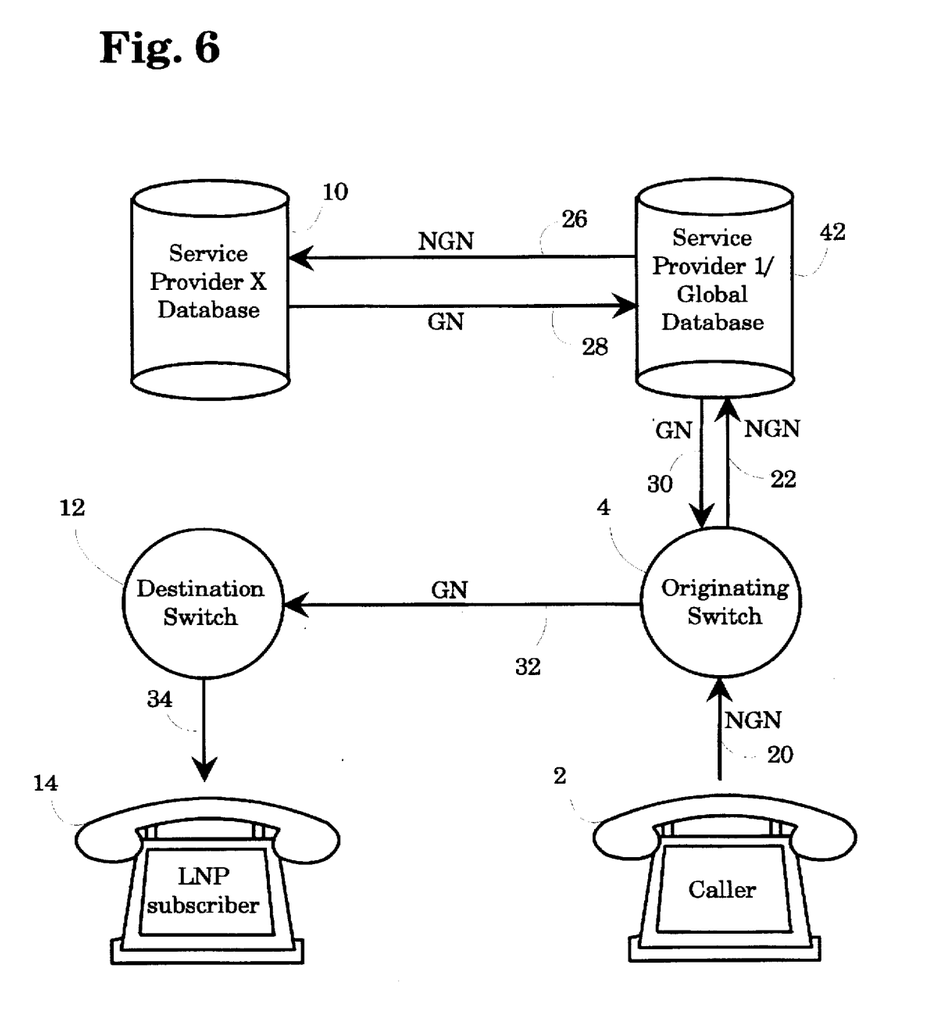
FIG. 6 is a logical block diagram of an apparatus for local number portability using nongeographic subscriber numbers that utilizes a combined service provider/global database with inter-database query according to an additional embodiment of the present invention.

A further embodiment of the apparatus, shown in FIG. 6, has a combined service provider/global database 42 that contains information for mapping the nongeographic subscriber numbers of the service provider's own subscribers to geographic terminal location numbers and information for mapping the remaining valid nongeographic subscriber numbers to service provider identification codes. This distributed implementation of the global local number portability database information has advantages in terms of reduced processing power requirements and reduced query turnaround delay, but a disadvantage is that service providers will also have a larger database to maintain and update.

In this embodiment, when a call is made at calling telecommunications terminal 2 utilizing a nongeographic subscriber number, the nongeographic subscriber number is sent as usual through an existing network connection 20 to the originating switch 4. The originating switch 4 formulates a request for translation query 22 and sends it to the combined service provider/global database 42. If the combined service provider/global database 42 has the information to map the nongeographic subscriber number to a geographic terminal location number, it returns the geographic terminal location number in a response message 30 to the originating switch 4. Otherwise it maps the nongeographic subscriber to a service provider identification code.

A search of the combined service provider/global database 42 can be performed in two alternate manners. In one embodiment, the combined service provider/global database 42 is searched first for an nongeographic subscriber number to geographic terminal location number mapping. If the geographic terminal location number is found, it is returned to the originating switch 4 and the call is routed accordingly. If the geographic terminal location number is not found, a search is then made for the nongeographic subscriber number to service provider identification code mapping. Alternatively, the combined service provider/global database 42 can first be searched for an nongeographic subscriber number to service provider identification code mapping. If the service provider identification code indicates that the nongeographic subscriber number is administered by the service provider that launched the query, a further search is made for the nongeographic subscriber number to geographic terminal location number mapping. If the service provider identification code contains network routing information, it is forwarded in a response 30 to the originating switch 4.

If the service provider identification code contains the address for a service provider database 10, in this embodiment of the invention the combined service provider/global database 42 formulates a request for translation query 26 and sends it to the service provider database 10. The service provider database 10 may itself also be a combined service provider/global database. The service provider database 10 returns the geographic terminal location number in a response 28 to the combined service provider/global database 42, which then returns it in a response 30 to the originating switch 4. Once the originating switch 4 receives a geographic terminal location number or network routing information, it routes the call with the geographic terminal location number using existing network call routing mechanisms 32 to a destination switch 12 or to another location designated by the received network routing information. The destination switch 12 then delivers the call through an existing network connection 34 to the local number portability subscriber's telecommunications terminal 14.

In this embodiment, one query step is eliminated because the combined service provider/global database 42 does not need to query a global local number portability database to get a nongeographic subscriber number to service provider identification code mapping. The combined service provider/global database 42 needs only to search its own database for a single mapping from the nongeographic subscriber number to either a geographic terminal location number or a service provider identification code. Updates of the service provider identification code mappings contained in the combined service provider/global database are necessary under this embodiment, and can be performed in real-time or at periodic intervals. Although this embodiment provides an advantage in response time over alternate embodiments when the combined service provider/global database 42 does not contain the mapping to a geographic terminal location number for a particular nongeographic subscriber number, it also requires that the service provider's database be larger than in some alternate embodiments.

Figure 7:
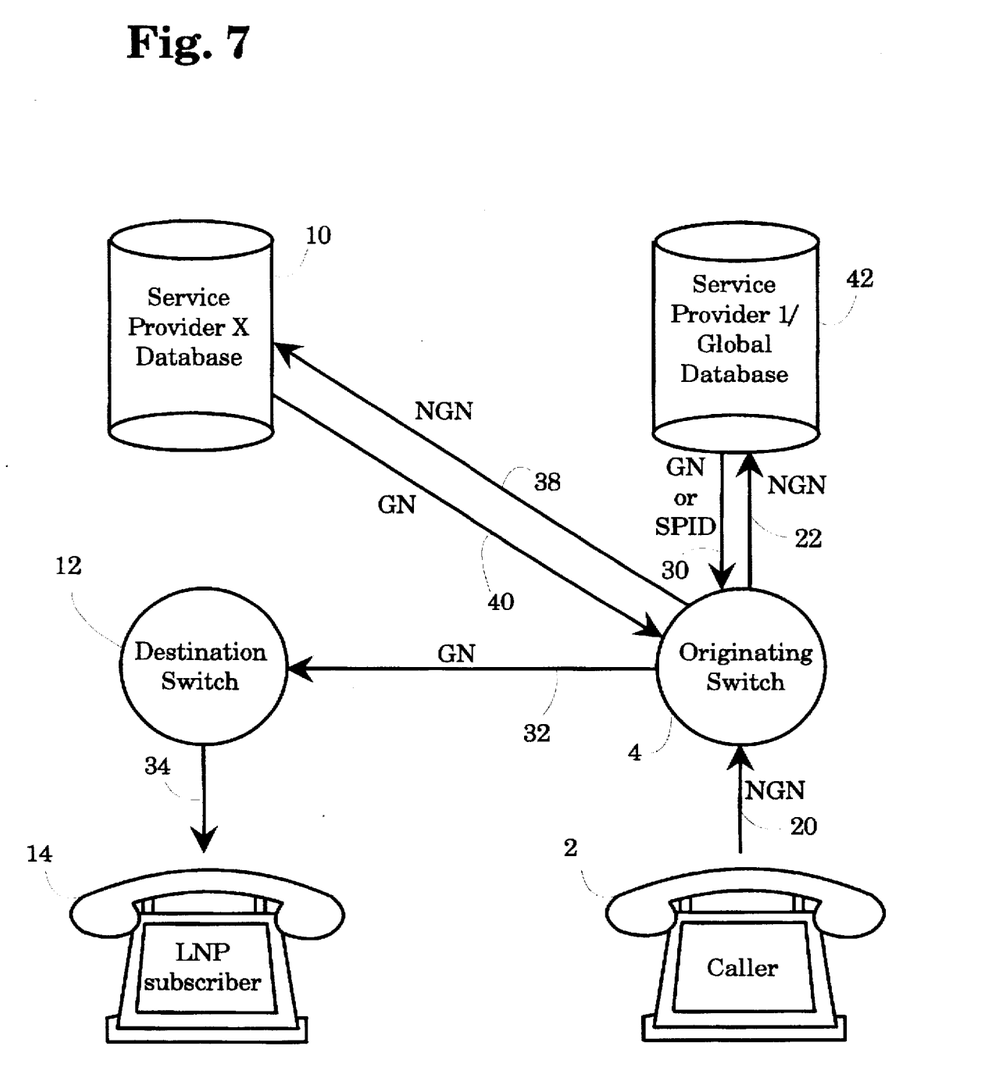
FIG. 7 is a similar view of an apparatus for local number portability using nongeographic subscriber numbers that utilizes a combined service provider/global database with direct originating switch query according to a further embodiment of the present invention.

An additional embodiment of the invention is shown in FIG. 7. In this embodiment, the apparatus again has a combined service provider/global database 42. The called number is received by the originating switch 4 in the normal manner. The originating switch 4 formulates a request for translation 22 and sends it to the combined service provider/global database 42. If the combined service provider/global database 42 has the information to map the nongeographic subscriber number to a geographic terminal location number, it does so and returns the geographic terminal location number in a response 30 to the originating switch 4, which then routes the call in the normal manner. Otherwise the combined service provider/global database 42 maps the nongeographic subscriber to a service provider identification code which it also returns in a response 30 to the originating switch 4.

The originating switch 4 has the capability to analyze the service provider identification code to determine whether it contains network routing information or the address of a service provider database 10. If the service provider identification code contains network routing information, the originating switch 4 will route the call using the network routing information for further handling. However, if the service provider identification code contains the address of a service provider database 10, in this embodiment of the invention the originating switch 4 formulates a request for translation 38 and sends it to the service provider database 10. The service provider database 10 may itself also be a combined service provider/global database. The service provider database 10 returns the geographic terminal location number in a response 40 to the originating switch 4, which then routes the call using existing network call routing mechanisms.

In some embodiments of the apparatus, the query and response interactions between the originating switch 4 and the service provider database 6 are implemented via an Intelligent Network (IN), utilizing the Transaction Capability Application Part (TCAP) protocol. In some alternate embodiments, the query and response interactions are implemented via an Advanced Intelligent Network (AIN), utilizing the Intelligent Network Application Part (INAP) protocol. In an AIN environment, the originating switch can be replaced by a Service Switching Point (SSP) with an additional Service Control Point (SCP) which has intelligence and potentially some local network portability database capability. This local network portability database capability may include nongeographic subscriber number to geographic terminal location number mapping, nongeographic subscriber number to service provider identification code mapping, or a combination. If the SCP has local network portability database capability, it is possible that it will be able to map the nongeographic subscriber number to a geographic terminal location number itself and thus will not need to do any external querying.

When a local number portability subscriber originates an outgoing call, the information placed in the signaling message will depend on the type of signaling used. The subscriber has both a nongeographic subscriber number, which is used as a customer identification, and a geographic terminal location number that is used by the network for routing. The apparatus for local number portability operates in both Multifrequency (MF) and SS7 signaling environments. If end-to-end SS7 signaling is available, in one embodiment of the apparatus the originating switch includes the following information in the Initial Address Message (IAM) for switch to switch connections:

Dialed nongeographic subscriber number, in the SS7 Generic Address Parameter (GAP)

Translated geographic terminal location number, in the SS7 Called Party Address Parameter NPA+NXX of the originating switch, in the Jurisdiction Information Parameter (JIP)

Calling Party's geographic terminal location number, in the Calling Party Address Parameter, or in another GAP with an appropriate indicator Calling Party's nongeographic subscriber number (if the calling party is also an LNP subscriber), in another GAP with an appropriate indicator, or in the Calling Party Address Parameter if it is not already used for the Calling Party's geographic terminal location number The called local number portability subscriber's number may also be passed back to the originating switch in associated SS7 messages, such as Answer messages, Address Complete messages, Release messages, or Release Complete messages.

Billing systems will generally require both the nongeographic subscriber number and the geographic terminal location number in order to bill calls properly. Since the apparatus of the invention serves to separate the process of subscriber identification from that of terminal identification, each local number portability subscriber will be uniquely identified by the nongeographic subscriber number for billing purposes, while the geographic terminal location number will be used to determine the distance between calling and receiving terminals. Existing routing mechanisms and billing methods remain unaffected for all numbers which are not local number portability nongeographic subscriber numbers.

In an MF environment, or one with mixed MF and SS7 signaling, information about the calling party is limited to what can be placed in the Automatic Number Identification (ANI) Digits/Calling Party Address Parameter. In one embodiment of the invention, the originating switch uses this field for the geographic terminal location number; in an alternate embodiment it is used for the nongeographic subscriber number. When the second embodiment is used, 911 services can obtain the geographic terminal location number by sending a query to the global local number portability database. Billing systems may utilize a similar strategy to perform the distance rating function.

Administratively, when a local number portability subscriber relocates but chooses to remain with the current service provider, the service provider will assign a geographic terminal location number from the new end office to the subscriber and will update the service provider database to reflect the mapping of the existing local number portability nongeographic subscriber number to the new geographic terminal location number. When a subscriber remains in the same location but chooses to change service providers, the new service provider allocates a geographic terminal location number from its serving end office and creates a mapping in its service provider database from the subscriber's existing local number portability nongeographic subscriber number to the newly assigned geographic terminal location number. The old service provider removes the mapping in its database from the subscriber's nongeographic subscriber number to the old geographic terminal location number. The new service provider also updates the nongeographic subscriber number to service provider identification code mapping in the global local number portability database. If the apparatus is implemented using any combined service provider/global databases, they would also be updated to reflect the changes. In the event that a subscriber simultaneously relocates and changes service providers, both procedures will be followed.

Provision of local number portability utilizing the apparatus of this invention will render local portability primarily transparent to both subscribers and nonsubscribers. Only callers to local number portability subscribers are likely to experience any form of extra post-dialing delay when this apparatus is in place. Use of nongeographic subscriber numbers provides a way for other end users and the network to identify subscribers who subscribe to local number portability. Although the apparatus of the invention requires introduction of databases and some modifications to switches, no new transmission facilities will be required, making local number portability far more cost-effective for both the service provider and the subscriber than the current Foreign Exchange service. In particular, use of nongeographic subscriber numbers means that the burden of local number portability service provision costs can be borne entirely by the local number portability subscribers.

Modifications and substitutions by one of ordinary skill in the art are considered to be within the scope of the present invention, which is not to be limited except by the claims which follow.

What is claimed is:

1. An apparatus for local number portability comprising, in combination:

local number portability database means for associating a plurality of nongeographic subscriber numbers with a plurality of geographic terminal location numbers, wherein each of said geographic terminal location numbers is further associated with a specific telecommunications terminal, and wherein said local number portability database means includes means for associating at least some of said nongeographic subscriber numbers with a respective one of a plurality of service provider identifications; and originating switch means for receiving from a calling telecommunications terminal a called number with an associated call and for appropriately routing said associated call, comprising, in combination:

means for directly routing said associated call to said telecommunications terminal associated with said called number if said called number is one of said geographic terminal location numbers;

means for querying said local number portability database means for said associated geographic terminal location number if said called number is one of said nongeographic subscriber numbers;

means for routing said associated call to the telecommunications terminal associated with said geographic terminal location number; and means for routing said associated call in response to receiving one of said respective service provider identifications from said local number portability database means.

2. The apparatus for local number portability of claim 1, further including destination switch means for receiving said geographic terminal location number and said associated call from said originating switch means and for routing said associated call to said telecommunications terminal associated with said geographic terminal location number.

3. The apparatus for local number portability of claim 2, wherein said local number portability database means is a combined service provider/global local number portability database means.

4. The apparatus for local number portability of claim 1, wherein:

said local number portability database means comprises service provider database means for one-to-one associating at least some of said plurality of nongeographic subscriber numbers with at least some of said plurality of geographic terminal location numbers and global local number portability database means for associating the remaining ones of said nongeographic subscriber numbers with said respective ones of said service provider identifications; and said service provider database means further includes means for querying said global local number portability database means for one of said service provider identifications if said service provider database means is unable to directly associate said nongeographic subscriber number with one of said geographic terminal location numbers.

5. The apparatus for local number portability of claim 4, wherein:

said service provider database means comprises at least two distinct service provider databases; and each of said distinct service provider databases includes means for querying a second one of said distinct service provider databases for one of said geographic terminal location numbers in response to receiving the respective one of said service provider identifications which uniquely identifies said second service provider database as a query response from said global local number portability database means.

6. The apparatus for local number portability of claim 5, further including destination switch means for receiving said geographic terminal location number and said associated call from said originating switch means and for routing said associated call to said telecommunications terminal associated with said geographic terminal location number.

7. The apparatus for local number portability of claim 4, wherein:

said service provider database means comprises at least two distinct service provider databases; and said originating switch means further includes means for querying a second one of said distinct service provider databases for one of said geographic terminal location numbers in response to receiving the respective one of said service provider identifications which uniquely identifies said second service provider database as a query response from a first one of said service provider databases.

8. The apparatus for local number portability of claim 7, further including destination switch means for receiving said geographic terminal location number and said associated call from said originating switch means and for routing said associated call to said telecommunications terminal associated with said geographic terminal location number.

9. The apparatus for local number portability of claim 1, wherein:

said local number portability database means comprises at least two distinct local number portability databases; and each of said distinct local number portability databases further includes means for querying for said geographic terminal location number a second one of said local number portability databases which is uniquely identified by said respective one of said service provider identifications which is associated with said received nongeographic subscriber number.

10. The apparatus for local number portability of claim 9, further including destination switch means for receiving said geographic terminal location number and said associated call from said originating switch means and for routing said associated call to said telecommunications terminal associated with said geographic terminal location number.

11. The apparatus for local number portability of claim 9, wherein at least one of said distinct local number portability databases is a combined service provider/global local number portability database.

12. The apparatus for local number portability of claim 11, further including destination switch means for receiving said geographic terminal location number and said associated call from said originating switch means and for routing said associated call to said telecommunications terminal associated with said geographic terminal location number.

13. The apparatus for local number portability of claim 1, wherein:

said local number portability database means comprises at least two distinct local number portability databases; and said originating switch means includes means for querying for one of said geographic terminal location numbers a second one of said distinct local number portability databases which is uniquely identified by said respective one of said service provider identifications which is associated with said received nongeographic subscriber number.

14. The apparatus for local number portability of claim 13, further including destination switch means for receiving said geographic terminal location number and said associated call from said originating switch means and for routing said associated call to said telecommunications terminal associated with said geographic terminal location number.

15. The apparatus for local number portability of claim 13, wherein at least one of said distinct local number portability databases is a combined service provider/global local number portability database.

16. The apparatus for local number portability of claim 15, further including destination switch means for receiving said geographic terminal location number and said associated call from said originating switch means and for routing said associated call to said telecommunications terminal associated with said geographic terminal location number.

17. An apparatus for telecommunications network local number portability comprising, in combination:

global local number portability database means for one-to-one associating a plurality of nongeographic subscriber numbers with a plurality of service provider identification codes, wherein each of said nongeographic subscriber numbers is uniquely distinguishable by content from each of a plurality of geographic terminal location numbers, and wherein each of said geographic terminal location numbers is further associated with a specific telecommunications terminal;

first service provider database means for one-to-one associating at least some of said plurality of nongeographic subscriber numbers with at least some of said plurality of geographic terminal location numbers, comprising, in combination:

means for querying said global local number portability database means if said first service provider database means is unable to directly associate said nongeographic subscriber number to one of said geographic terminal location numbers;

means for receiving one of said service provider identification codes from said global local number portability database means;

means for identifying whether said received service provider identification code is a network routing instruction or an address uniquely identifying one of a plurality of second service provider database means; and means for querying one of said second service provider database means for said geographic terminal location number after receiving as a response from said global database means one of said service provider identification codes which uniquely identifies one of said second service provider database means;

originating switch means for receiving from a calling telecommunications terminal a called number with an associated call and for appropriately routing said associated call, comprising, in combination:

means for determining whether said called number is one of said geographic terminal location numbers or one of said nongeographic subscriber numbers;

means for querying said first service provider database means for said associated geographic terminal location number if said called number is one of said nongeographic subscriber numbers;

means for routing said associated call to the telecommunications terminal associated with said geographic terminal location number; and means for routing said associated call according to a received one of said service provider identification codes if said received service provider identification code is a network routing instruction; and destination switch means for receiving said geographic terminal location number and said associated call from said originating switch means and for routing said associated call to said telecommunications terminal associated with said geographic terminal location number.

18. A method for telecommunications network local number portability, comprising, in combination, the steps of:

receiving with an originating switch means a called number with an associated call from a calling telecommunications terminal;

identifying whether said received called number is one of a plurality of geographic terminal location numbers which are one-to-one associated with a plurality of telecommunications terminals or one of a plurality of nongeographic subscriber numbers which are one-to-one associated with said plurality of geographic terminal location numbers;

directly routing said associated call to the telecommunications terminal associated with said called number if said called number is one of said geographic terminal location numbers;

querying a service provider database means for said geographic terminal location number if said called number is one of said nongeographic subscriber numbers;

mapping, utilizing said service provider database means, at least some of said plurality of nongeographic subscriber numbers to at least some of said plurality of geographic terminal location numbers;

querying a global database means if said service provider database means is unable to directly map said nongeographic subscriber number to one of said geographic terminal location numbers;

mapping, utilizing said global database means, said nongeographic subscriber number to one of plurality of service provider identification codes or to one of said geographic terminal location numbers if said service provider database means is unable to directly map said nongeographic subscriber number to one of said geographic terminal location numbers;

receiving with said originating switch means one of said geographic terminal location numbers or one of said service provider identification codes as a response from said service provider database means;

routing said associated call to the telecommunications terminal associated with said geographic terminal location number if said response from said service provider database means is one of said geographic terminal location numbers;

routing said associated call according to said service provider identification code if said service provider identification code does not uniquely identify a second service provider database means;

querying said second service provider database means for said geographic terminal location number if said received service provider identification code uniquely identifies said second service provider database means; and receiving returned geographic terminal location number from said second service provider database and routing said associated call to the telecommunications terminal associated with said geographic terminal location number.

19. The method of claim 18, further including, in combination, the steps of:

receiving said geographic terminal location number and said associated call from said originating switch means at an intermediate switch means; and routing said associated call from said intermediate switch means to said telecommunications terminal associated with said geographic terminal location number.

20. The method of claim 18, further including, in combination, the steps of:
  receiving said geographic terminal location number and said associated call from said originating switch means at an intermediate switch means;
  routing said associated call from said intermediate switch means to a destination switch means;
  receiving said geographic terminal location number and said associated call from said intermediate switch means at said destination switch means; and
  routing said associated call from said destination switch means to said telecommunications terminal associated with said geographic terminal location number.

21. The method for telecommunications network local number portability of claim 18, further including, in combination, the steps of:
  receiving said geographic terminal location number and said associated call from said originating switch means at a destination switch means; and
  routing said associated call from said destination switch means to said telecommunications terminal associated with said geographic terminal location number.

22. An apparatus for telecommunications network local number portability comprising, in combination:
  global local number portability database means for one-to-one associating a plurality of nongeographic subscriber numbers with a plurality of service provider identification codes, wherein each of said nongeographic subscriber numbers is uniquely distinguishable by content from each of a plurality of geographic terminal location numbers, and wherein each of said geographic terminal location numbers is further associated with a specific telecommunications terminal;
  first service provider database means for one-to-one associating at least some of said plurality of nongeographic subscriber numbers with at least some of said plurality of geographic terminal location numbers, comprising, in combination:
    means for querying said global local number portability database means if said first service provider database means is unable to directly associate said nongeographic subscriber number to one of said geographic terminal location numbers; and
    means for receiving one of said service provider identification codes from said global local number portability database means;
  originating switch means for receiving from a calling telecommunications terminal a called number with an associated call and for appropriately routing said associated call, comprising, in combination:
    means for directly routing said associated call to the telecommunications terminal associated with said called number if said called number is one of said geographic terminal location numbers;
    means for querying said first service provider database means for said associated geographic terminal location number if said called number is one of said nongeographic subscriber numbers;
    means for receiving from said first service provider database one of said geographic terminal location numbers or one of said service provider identification codes;
    means for identifying whether said received service provider identification code is a network routing instruction or an address uniquely identifying one of a plurality of second service provider database means;
    means for querying one of said second service provider database means for said geographic terminal location number after receiving as a response from said global database means one of said service provider identification codes which uniquely identifies one of said second service provider database means;
    means for routing said associated call to the telecommunications terminal associated with said received geographic terminal location number; and
    means for routing said associated call according to a received one of said service provider identification codes if said received service provider identification code is a network routing instruction; and
  destination switch means for receiving said geographic terminal location number and said associated call from said originating switch means and for routing said associated call to said telecommunications terminal associated with said geographic terminal location number.

23. An apparatus for telecommunications network local number portability comprising, in combination:
  first combined service provider/global local number portability database means for one-to-one associating at least some of a plurality of nongeographic subscriber numbers with at least some of a plurality of geographic terminal location numbers, wherein each of said geographic terminal location numbers is further associated with a specific telecommunications terminal and wherein each of said nongeographic subscriber numbers is uniquely distinguishable by content from each of said geographic terminal location numbers, said first combined service provider/global local number portability database means further comprising, in combination:
    means for one-to-one associating the remaining ones of said plurality of nongeographic subscriber numbers with a plurality of service provider identification codes;
    means for identifying whether said service provider identification code is a network routing instruction or an address uniquely identifying one of a plurality of second combined service provider/global local number portability database means; and
    means for querying one of said second combined service provider/global local number portability database means for said geographic terminal location number after mapping said received nongeographic subscriber number to one of said service provider identification codes which uniquely identifies one of said second combined service provider/global local number portability database means;
  originating switch means for receiving from a calling telecommunications terminal a called number with an associated call and for appropriately routing said associated call, comprising, in combination:
    means for directly routing said associated call to the telecommunications terminal associated with said called number if said called number is one of said geographic terminal location numbers;
    means for querying said first combined service provider/global local number portability database means for said associated geographic terminal location number if said called number is one of said nongeographic subscriber numbers;
    means for routing said associated call to the telecommunications terminal associated with said received geographic terminal location number; and means for routing said associated call according to a received one of said service provider identification codes if said received service provider identification code is a network routing instruction; and destination switch means for receiving said geographic terminal location number and said associated call from said originating switch means and for routing said associated call to said telecommunications terminal associated with said geographic terminal location number.

24. An apparatus for telecommunications network local number portability comprising, in combination:

first combined service provider/global local number portability database means for one-to-one associating at least some of a plurality of nongeographic subscriber numbers with at least some of a plurality of geographic terminal location numbers, wherein each of said geographic terminal location numbers is further associated with a specific telecommunications terminal and wherein each of said nongeographic subscriber numbers is uniquely distinguishable by content from each of said geographic terminal location numbers, said first combined service provider/global local number portability database means further comprising means for one-to-one associating the remaining ones of said plurality of nongeographic subscriber numbers with a plurality of service provider identification codes;

originating switch means for receiving from a calling telecommunications terminal a called number with an associated call and for appropriately routing said associated call, comprising, in combination:

means for directly routing said associated call to the telecommunications terminal associated with said called number if said called number is one of said geographic terminal location numbers;

means for querying said first combined service provider/global local number portability database means for said associated geographic terminal location number if said called number is one of said nongeographic subscriber numbers;

means for routing said associated call to the telecommunications terminal associated with said received geographic terminal location number;

means for identifying whether a received one of said service provider identification code is a network routing instruction or an address uniquely identifying one of a plurality of second combined service provider/global local number portability database means;

means for querying one of said second combined service provider/global local number portability database means for said geographic terminal location number after receiving one of said service provider identification codes which uniquely identifies one of said second combined service provider/global local number portability database means; and means for routing said associated call according to a received one of said service provider identification codes if said received service provider identification code is a network routing instruction; and destination switch means for receiving said geographic terminal location number and said associated call from said originating switch means and for routing said associated call to said telecommunications terminal associated with said geographic terminal location number.

25. An apparatus for telecommunications network local number portability comprising, in combination:

global local number portability database means for one-to-one associating a plurality of nongeographic subscriber numbers with a plurality of service provider identification codes or a plurality of geographic terminal location numbers, wherein each of said nongeographic subscriber numbers is uniquely distinguishable by content from each of said plurality of geographic terminal location numbers, and wherein each of said geographic terminal location numbers is further associated with a specific telecommunications terminal;

at least one service provider database means for one-to-one associating at least some of said plurality of nongeographic subscriber numbers with at least some of said plurality of geographic terminal location numbers, each of said service provider database means being uniquely associated with one of said service provider identification codes;

intermediate switch means, comprising, in combination:

means for querying one of said service provider database means identified by a received one of said service provider identification codes for said geographic terminal location number associated with a received one of said nongeographic subscriber numbers; and means for routing a received call to the telecommunications terminal associated with said geographic terminal location number;

originating switch means for receiving from a calling telecommunications terminal a called number with an associated call and for appropriately routing said associated call, comprising, in combination:

means for querying said global local number portability database means for said associated geographic terminal location number if said called number is one of said nongeographic subscriber numbers;

means for receiving from said global local number portability database means one of said geographic terminal location numbers or one of said service provider identification codes;

means for identifying whether said received service provider identification code is a network routing instruction or an address uniquely identifying one of said service provider database means;

means for routing said associated call according to a received one of said service provider identification codes if said received service provider identification code is a network routing instruction;

means for routing said associated call and said nongeographic subscriber number to said intermediate switch after receiving as a response from said global database means one of said service provider identification codes which uniquely identifies one of said service provider database means; and means for routing said associated call to the telecommunications terminal associated with said received geographic terminal location number.

26. The apparatus for local number portability of claim 25, further including destination switch means for receiving said geographic terminal location number and said associated call from said intermediate switch means and for routing said associated call to said telecommunications terminal associated with said geographic terminal location number.

27. The apparatus for local number portability of claim 25, wherein said global local number portability database means comprises a distinct service provider database means and a distinct global local number portability database means, said originating switch means first queries said distinct service provider database means for said associated geographic terminal location number, and said distinct service provider database means queries said distinct global local number portability database means for said associated geographic terminal location number or said service provider identification code if said distinct service provider database means is unable to directly associate said nongeographic subscriber number with said associated geographic terminal location number or one of said service provider identification codes.

28. The apparatus for local number portability of claim 27, further including destination switch means for receiving said geographic terminal location number and said associated call from said intermediate switch means and for routing said associated call to said telecommunications terminal associated with said geographic terminal location number.

* * * * *